United States Patent

Oakland

[19]

[11] Patent Number: 6,134,682
[45] Date of Patent: Oct. 17, 2000

[54] TESTABLE BUS CONTROL LOGIC CIRCUITRY AND METHOD FOR USING SAME

[75] Inventor: Steven F. Oakland, Colchester, Vt.

[73] Assignee: International Business Machines Corporation, Armonk, N.Y.

[21] Appl. No.: 09/143,886

[22] Filed: Aug. 31, 1998

[51] Int. Cl.[7] .......................... G11C 29/00; G01R 31/28
[52] U.S. Cl. ........................ 714/712; 714/730; 326/56
[58] Field of Search .................. 326/56, 82, 86, 326/90, 104, 105; 365/230.06, 230.01, 201; 714/712, 724, 730, 733, 734, 735, 736, 742, 743

[56] References Cited

U.S. PATENT DOCUMENTS

| | | | |
|---|---|---|---|
| 3,387,262 | 6/1968 | Ottaway et al. | |
| 5,107,230 | 4/1992 | King | 326/86 |
| 5,448,182 | 9/1995 | Countryman et al. | 326/30 |
| 5,585,742 | 12/1996 | Kamiya | 326/56 |
| 5,648,733 | 7/1997 | Worrell et al. | 326/86 |
| 5,999,013 | 12/1999 | Elliott | 326/16 |

*Primary Examiner*—Christine Trinh L. Tu
*Attorney, Agent, or Firm*—Schmeiser, Olsen & Watts; Eugene I. Shkurko

[57] ABSTRACT

A bus control logic circuit is provided that may be tested for a variety of bus fault conditions including no-connection faults, cross-connection faults and bus-contention stuck faults. The bus control logic circuit operates in a normal mode and in a test mode. In the normal mode, the bus control logic circuit operates as a conventional driver decoder and is testable for no-connection faults and cross-connection faults. In the test mode, the bus control logic circuit also is testable for bus-contention stuck faults. To test for bus-contention stuck faults, drivers having addresses of a first parity are hard disabled and one of the hard disabled drivers is addressed. Because the addressed driver is hard disabled, the only driver that can be enabled is a non-addressed driver erroneously enabled due to a bus-contention stuck fault. To detect the bus-contention stuck fault, the signal line is placed in a known logic state that only changes if a driver is erroneously enabled due to a bus-contention stuck fault. Therefore, a change in the logic state of the signal line indicates the presence of a bus-contention stuck fault.

22 Claims, 4 Drawing Sheets

TESTABLE BUS CONTROL LOGIC CIRCUITRY AND METHOD FOR USING SAME

FIELD OF THE INVENTION

The present invention relates generally to bus design, and more specifically to the design of testable bus control logic circuitry.

BACKGROUND OF THE INVENTION

Integrated circuits such as microprocessors, microcomputers, microcontrollers, and the like comprise a number of functional units (e.g., memories, input interfaces, output interfaces, arithmetic and logic units, etc.) that are interconnected and share information. Information in the form of digital signals typically is shared amongst functional units in a parallel manner via transmission over a plurality of shared signal lines termed a bus.

To transmit or drive digital signals on a bus, each functional unit is coupled to each signal line of the bus via a driver that provides the voltage and current levels required to drive the signal line. Thus, each functional unit has at least one driver per signal line.

Most drivers are three-state drivers that comprise an input terminal for receiving digital signals from the functional unit, an output terminal for outputting a buffered version of the digital signals consistent with the voltage/current requirements of the bus, and an enable terminal for selectively enabling/disabling the driver. A driver coupled to a signal line thus can pull the signal line to a low voltage (e.g., zero volts) logic state or a "low state", can pull the signal line to a high voltage (e.g., 3.5 volts, 5 volts, etc.) logic state or "high state", or can leave the signal line in a floating or "high impedance" state when the driver is disabled, for example, via lack of an enable signal on the driver's enable terminal.

Because multiple functional units share a bus, multiple drivers often are coupled to each signal line. During normal bus operation, only one driver at a time drives a signal line. Nonetheless, under certain circumstances multiple drivers can attempt to simultaneously drive a signal line (i.e., bus contention). Bus contention is problematic because it leads to uncertainty as to the logic state of the signal line (e.g., when one driver drives a signal line with a low voltage while another driver drives the signal line with a high voltage), and because excessive current and voltage levels may be produced on a signal line that can damage driver circuitry and/or the various functional units connected to the signal line.

FIG. 1A is a schematic view of a conventional bus control logic circuit 100 designed to avoid bus contention on a signal line 102 of a bus (not shown). Specifically, bus control logic circuit 100 comprises a driver decoder 104 having a first and a second address input terminal 106a, 106b, respectively, and having a plurality of output terminals 108a–d. When the bus control logic circuit 100 is used to control a plurality of drivers 110a–d coupled to the signal line 102, each output terminal 108a–d of the driver decoder 104 is connected, respectively, to an enable input terminal 112a–d of each the driver 110a–d.

The driver decoder 104 is configured so that only one output terminal 108a–d at time is at a high state, the logic state required to enable the drivers 110a–d. Each output terminal 108a–d is placed at the high state through a unique combination of high or low states present on the first and second address input terminals 106a, 106b. TABLE 1A shows the logic state of each output terminal 108a–d for each combination of high or low states present on the first and second address input terminals 106a, 106b. A low state is represented by 0 and a high voltage state is represented by 1.

TABLE 1A

| FIRST ADDRESS INPUT TERMINAL 106a | SECOND ADDRESS INPUT TERMINAL 106b | OUTPUT TERMINAL 108a | OUTPUT TERMINAL 108b | OUTPUT TERMINAL 108c | OUTPUT TERMINAL 108d |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

In addition to an enable input terminal 112a–d, each driver 110a–d has a data input terminal 114a–d, respectively, and a driver output terminal 116a–d, respectively. Each driver output terminal 116a–d of each driver 110a–d is coupled to the signal line 102 as shown in FIG. 1A.

Each data input terminal 114a–d of each driver 110a–d is connected to a unique functional unit (not shown) and allows the functional unit to drive digital signals over the signal line 102 via the respective driver. For instance, assuming the first driver 110a is enabled (via a high state on the enable input terminal 112a), a functional unit A (not shown) coupled to the first driver 110a may drive data on the signal line 102 by outputting digital signals to the data input terminal 114a of the first driver 110a, thereby causing the first driver 110a to output corresponding digital signals on the driver output terminal 116a, whereas if the second driver 110b is enabled, a functional unit B (not shown) coupled to the second driver 110b may drive digital signals on the signal line 102 by outputting the digital signals to the data input terminal 114b of the second driver 110b thereby causing the second driver 110b to output corresponding digital signals on the driver output terminal 116b, etc.

Also shown in FIG. 1A are a soft driver 118 and a buffer 126. As with the drivers 110a–d, the soft driver 118 has an enable input terminal 120, a driver output terminal 122 coupled to the signal line 102, and a data input terminal 124. The buffer 126 has a buffer input terminal 128 coupled to the signal line 102 and a buffer output terminal 130. In operation, when enabled, the soft driver 118 pulls the signal line 102 to a high or a low state based on a logic state input to the data input terminal 124, and the buffer 126 monitors the logic state of the signal line 102. As described below, both the soft driver 118 and the buffer 126 are used for testing the bus control logic circuit 100.

During normal operation, a controller (not shown) such as a microprocessor or a dedicated controlling mechanism regulates functional unit access to the signal line 102 via the bus control logic circuit 100 by controlling the address signals provided to the first and second address input terminals 106a, 106b of the driver decoder 104. For example, if a functional unit is to drive digital signals on the signal line 102 via the data input terminal 114a, the controller must drive both the first address input terminal 106a and the second address input terminal 106b to a low state so that the output terminal 108a outputs a high state (TABLE 1A). The high state on the output terminal 108a drives the enable input terminal 112a of the first driver 110a, enabling the first driver 110a. Thereafter, the functional unit may drive digital signals on the signal line 102 by driving the data input terminal 114a of the first driver 110a with the digital signals so that the first driver 110a outputs (via the driver output terminal 116a) corresponding digital signals on the signal line 102. As shown in TABLE 1A, when the first driver 110a is enabled, the enable input terminal 112b–d of every other driver 110b–d is driven to a low state so that drivers 110b–d are disabled. The remaining drivers 110b–d may be similarly used by other functional units to drive digital signals on the signal line 102. Because the driver decoder 104 only allows one of the drivers 110a–d at a time to be enabled, when the bus control logic circuit 100 functions properly, bus contention does not occur.

When the bus control logic circuit 100 fails to operate properly, however, three types of bus faults can exist:

1. no driver is enabled in response to address signals present on the address input terminals 106a–b (i.e., a "no-connection fault");

2. the wrong driver is enabled in response to address signals present on the address input terminals 106a–b (i.e., a "cross-connection fault"); and 3. in addition to the intended driver, a second driver is enabled and drives the signal line 102 in response to address signals present on the address input terminals 106a–b (i.e., a "bus-contention stuck fault").

Fortunately, the bus control logic circuit 100 can be tested for the first two bus faults, the no-connection and the cross-connection bus faults. Testing for these two types of bus faults typically is performed as a quality assurance measure during the manufacture of integrated circuits employing the bus control logic circuit 100.

To test for a no-connection fault within the bus control logic circuit 100, the soft driver 118 is used to either pull the signal line 102 to a high state or to a low state by driving the data input terminal 124 with the desired logic state and by enabling the soft driver 118 via the enable input terminal 120 (so as to drive the signal line 102 to the desired logic state). Because the driver 118 is a "soft" driver, the drivers 110a–d can override a signal line logic state set by the soft driver 118. Accordingly, to test for a no-connection fault, each driver 110a–d is sequentially enabled and caused to drive the signal line 102 with a logic state different from the logic state set by the soft driver 118. The logic state of the signal line 102 is monitored by the buffer 126. If any driver 110a–d is unable to change the logic state of the signal line 102 as set by the soft driver 118, the presence of a no-connection bus fault within the portion of the logic circuitry controlling that driver (i.e., the driver's driver circuitry) is confirmed.

The presence of a cross-connection bus fault within the bus control logic circuit 100 can be determined without the use of the soft driver 118. To test for a cross-connection bus fault within the driver circuitry of the first driver 110a, the first and second address input terminals 106a, 106b are driven with the address signals corresponding to the address of the first driver 110a (e.g., 0, 0), and the data input terminal 114a is set to drive a first logic state on the signal line 102 if the first driver 110a is enabled. The remaining drivers 110b–d are set to drive a second, opposite logic state on the signal line 102, and the logic state of the signal line 102 is monitored via the buffer 126. If the logic state of the signal line 102 is determined to be the first logic state, then no cross-connection bus fault exists with regard to the driver circuitry of the first driver 110a. Likewise, if the logic state of the signal line 102 is determined to be the second logic state, then a cross-connection bus fault exists with regard to the driver circuitry of the first driver 110a. The driver circuitry for the remaining drivers 110b–d may be tested in the same manner for cross-connection bus faults.

As stated, the third type of bus fault is the bus-contention stuck fault. A bus-contention stuck fault arises when an input terminal of a logic gate within driver circuitry is "stuck" or pinned at one logic state due to a manufacturing defect. FIG. 1B is a schematic view of a portion of the logic circuitry within a typical NOR gate decoder, and is useful for explaining stuck fault bus contention.

The portion of the logic circuitry shown comprises a first NOR gate 132 having a first input terminal 132a, a second input terminal 132b and an output terminal 132c, and a second NOR gate 134 having a first input terminal 134a, a second input terminal 134b and an output terminal 134c. The circuitry further comprises a first address input terminal 138, a second address input terminal 140, and an inverter 136 having an input terminal 136a and an output terminal 136b. The various components of the portion of the logic circuitry are connected as follows: the first address input terminal 138 is connected to the first input terminal 132a of the first NOR gate 132 and to the first input terminal 134a of the second NOR gate 134; the second address input terminal 140 is connected to the input terminal 136a of the inverter 136 and to the second input terminal 132b of the first NOR gate 132; and the output terminal 136b of the inverter 136 is connected to the second input terminal 134b of the second NOR gate 134. When the circuitry of FIG. 1B is employed to control drivers, the output terminals 132c and 134c of each NOR gate 132 and 134, respectively, each couple to an enable input terminal of a unique driver so as to allow each unique driver to be selectively enabled as described below.

To aid in understanding the operation of the logic circuitry of FIG. 1B, the truth table for a NOR gate having inputs A, B and output C is shown in TABLE 1B:

TABLE 1B

| A | B | C |
| --- | --- | --- |
| 0 | 0 | 1 |
| 0 | 1 | 0 |
| 1 | 0 | 0 |
| 1 | 1 | 0 |

As seen in TABLE 1B, the output of a NOR gate is in a high state only when both inputs are in a low state.

With reference to FIG. 1B, absent a bus-contention stuck fault, when both the address input terminals 138 and 140 are driven to a low state (e.g., by a functional unit, or by a controller), input terminals 132a, 132b and 134a are driven to a low state, while input terminal 134b is driven to a high state via the inverter 136. Because both input terminals 132a–b are driven to a low state, the output terminal 132c of the first NOR gate 132 is driven to a high state, enabling any driver connected thereto. Further, because both input terminals 134a–b are not driven to a low state, the output terminal 134c of the second NOR gate 134 is driven to a low state, disabling any driver connected thereto.

Similarly, absent a bus-contention stuck fault, when the address input terminal 138 is driven to a low state and the address input terminal 140 is driven to a high state, input terminals 132a, 134a and 134b (via the inverter 136) are driven to a low state, and the input terminal 132b is driven to a high state. Accordingly, the output terminal 132c of the first NOR gate 132 is driven to a low state (disabling any driver connected thereto) and the output terminal 134c of the second NOR gate 134 is driven to a high state (enabling any driver connected thereto). Thus, no matter what logic states exist on the address input terminals 138 and 140, no more than one driver is enabled at a time and bus contention does not occur.

However, when a bus-contention stuck fault is present two drivers can be enabled simultaneously. For example, assume a bus-contention stuck fault (F) is present on the input terminal 132b of the first NOR gate 132. The bus-contention stuck fault (F) causes the logic state of the input terminal 132b to remain at a low state regardless of the logic state present on the address input terminal 140. As such, when the address input terminal 138 is driven to a low state and the address input terminal 140 is driven to a high state, all input terminals 132a, 132b, 134a and 134b are driven to a low state. Both the output terminal 132c and the output terminal 134c therefore are driven to a high state, enabling multiple drivers and resulting in stuck-fault bus contention.

While the bus control logic circuit 100 can be tested for no-connection and for cross-connection bus faults (as previously described), normally it cannot be tested for stuck-fault bus contention. Because the signal line 102, the drivers 110a–d, and the bus control logic circuit 100 typically are embedded within an integrated circuit, the voltage and current levels present on the signal line 102 cannot be directly observed. The only measure of the voltage and current levels present on the signal line 102 is an indirect, buffered version provided by a buffer such as the buffer 126. That is, even though a bus-contention stuck fault may in some cases produce a substantially larger-than-normal current level on the signal line 102 (e.g., when a first driver drives the signal line 102 to a low voltage level while another driver drives the signal line 102 to a high voltage level), the buffer 126 provides no information about the actual current level present on the signal line 102. The buffer 126 merely provides an indication that the voltage level present on the signal line 102 is low enough to be considered a low voltage logic state or is high enough to be considered a high voltage logic state. Thus, bus contention (e.g., due to a bus-contention stuck fault) within the bus control logic circuit 100 normally cannot be observed.

Accordingly, a need exists for bus control logic circuitry that can be tested for bus-contention stuck faults as well as for no-connection and cross-connection faults. Such bus control logic circuitry will improve significantly the quality assurance testing of integrated circuits containing bus systems.

SUMMARY OF THE INVENTION

To address the needs of the prior art an inventive bus control logic circuit is provided that is testable for no-connection faults, cross-connection faults and bus-contention stuck faults. The inventive bus control logic circuit operates in a normal mode as a conventional driver decoder and in a test mode. When operated in the normal mode, the inventive bus control logic circuit is testable for no-connection faults and cross-connection faults in the same manner as conventional bus control logic circuitry. When operated in the test mode, the inventive bus control logic circuit is testable for bus-contention stuck faults.

The inventive bus control logic circuit comprises a disable circuit coupled to a driver decoder. The disable circuit has a test enable input terminal for switching the bus control logic circuit between the normal mode and the test mode, and has a test parity input terminal for selectively disabling (based on parity) a plurality of drivers as described below. Drivers are coupled to output terminals of the driver decoder, and each driver is assigned an address having either odd or even parity.

In order to understand how the inventive bus control logic circuit works, it is necessary to define the terms soft disabled and hard disabled. A driver is enabled when its address is input to the driver decoder. A driver that is not-enabled (because its address has not been input to the driver decoder) is "soft disabled." When the bus control logic circuit is placed in the test mode, the disable circuit can selectively disable (based on parity) drivers rendering those drivers "hard disabled." A hard disabled driver cannot be enabled when its address is input to the driver decoder.

To test the inventive bus control logic circuit for a bus-contention stuck fault, the signal line is placed in a known logic state, drivers having addresses of a first parity are hard disabled, and one of the hard disabled drivers is addressed. Because the addressed driver is hard disabled, the only driver that can be enabled is a non-addressed driver erroneously enabled due to a bus-contention stuck fault. Thus, if the non-addressed driver drives the signal line to a different logic state, the change in the logic state of the signal line indicates the presence of a bus-contention stuck fault. If the above process is repeated while varying which drivers are selectively hard disabled (based on parity), and which non-addressed drivers can change the state of the signal line if erroneously enabled, each driver's driver circuitry can be tested for a bus-contention stuck fault.

The inventive method is able to detect bus-contention stuck faults without causing bus contention because even and odd parity addresses can differ by as little as one bit, whereas different addresses of the same parity differ by at least 2 bits. Therefore, assuming only one bit of an address is altered by a bus-contention stuck fault within a driver's driver circuitry (e.g., a single stuck fault model) only an odd parity address can erroneously enable a driver having an even parity address and faulted driver circuitry; and only an even parity address can erroneously enable a driver having an odd parity address and faulted driver circuitry.

Other objects, features and advantages of the present invention, as well as the structure and the operation of various embodiments of the invention, will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numerals indicate identical or functionally similar elements. Additionally, the leftmost digit of a reference numeral identifies the drawing in which the reference numeral first appears.

DETAILED DESCRIPTION OF THE PREFERRED EMBODIMENTS

Figure 2:
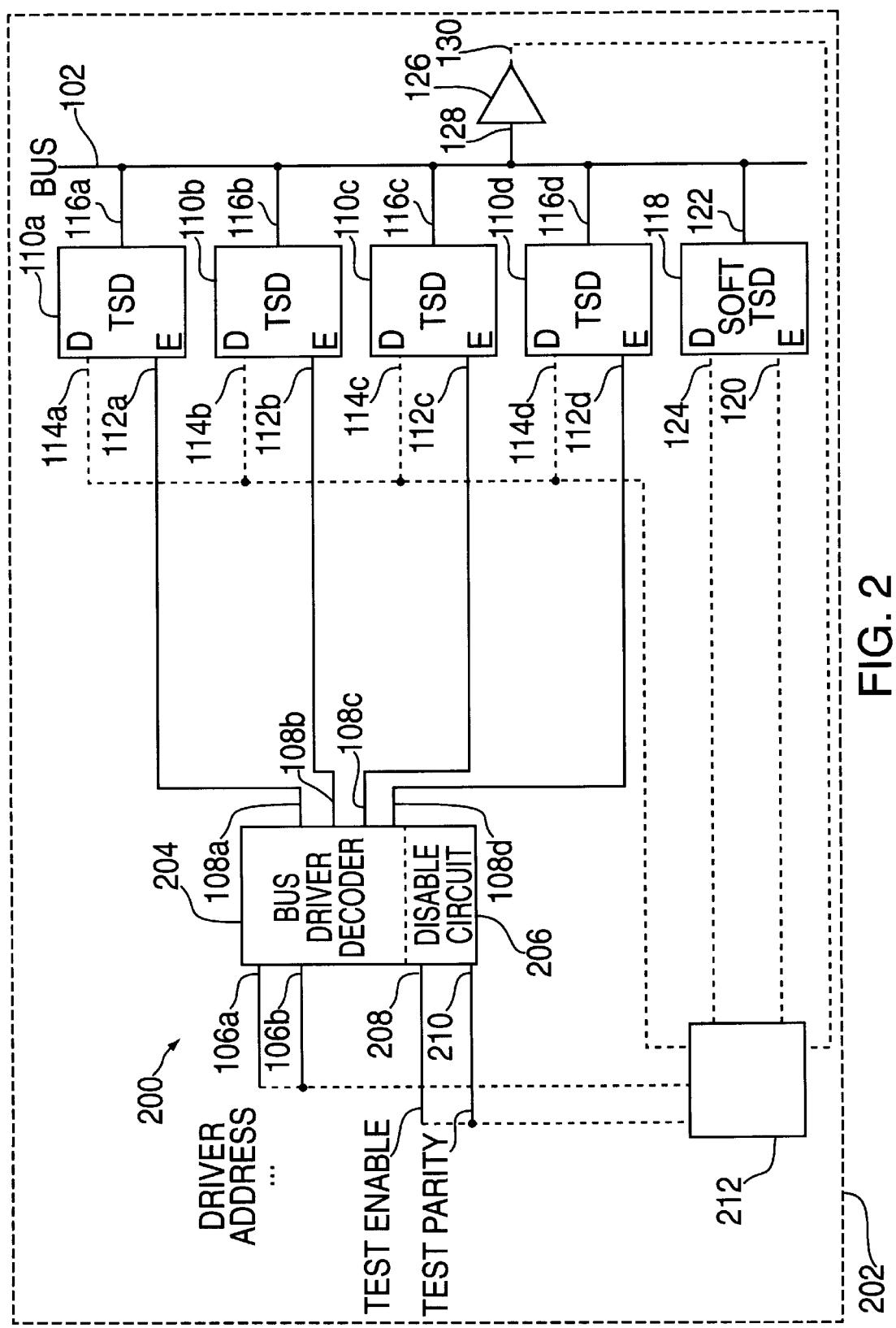
FIG. 2 is a schematic diagram of an inventive testable bus control logic circuit employed within an integrated circuit.

FIG. 2 is a schematic diagram of an inventive testable bus control logic circuit 200 ("control circuit 200") employed as part of an integrated circuit 202. The integrated circuit 202 may comprise, for example, a microprocessor, a microcontroller or an entire computer system.

Figure 1A:
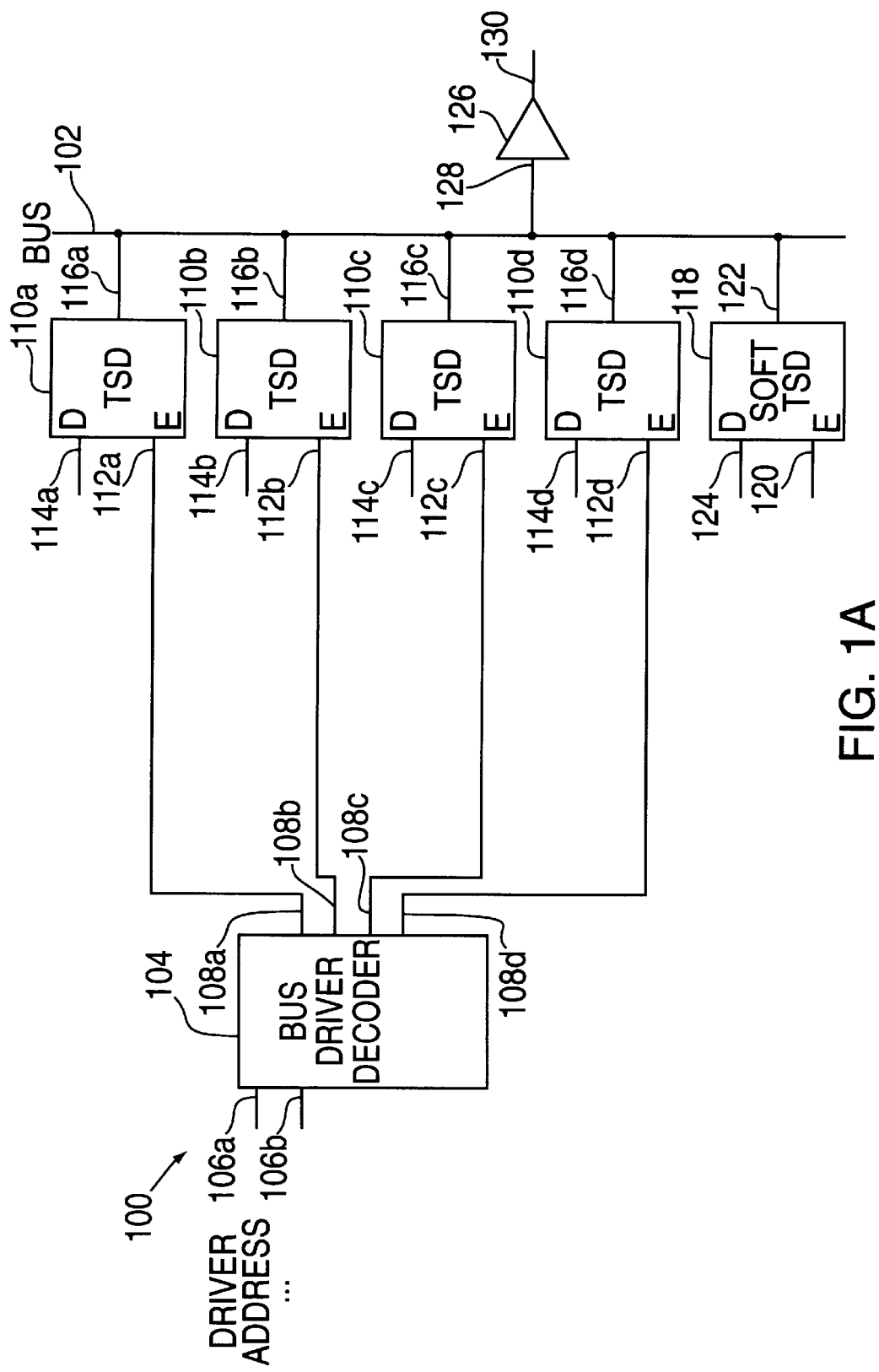
FIG. 1A is a schematic diagram of a conventional bus control logic circuit for avoiding bus contention as previously described.
Figure 1B:
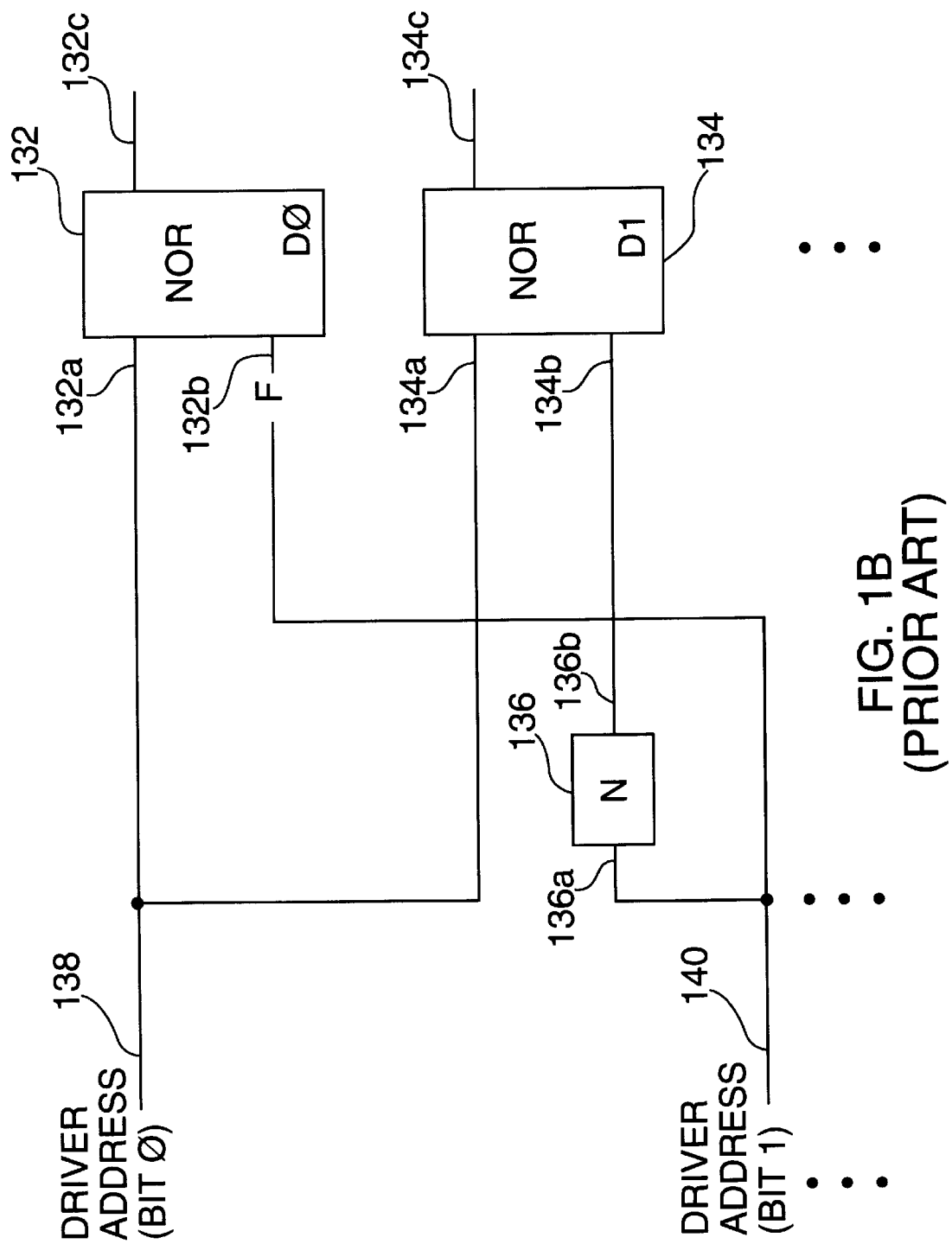
FIG. 1B is a schematic diagram of a portion of a conventional NOR gate decoder as previously described.

Like the conventional bus control logic circuit 100 of FIG. 1A, the inventive control circuit 200 comprises a driver decoder 204 ("decoder 204") having a first and a second address input terminal 106a, 106b and having a plurality of output terminals 108a–d for coupling to a plurality of drivers 110a–d. The plurality of drivers 110a–d couple a signal line 102, as do a soft driver 118 and a buffer 126.

Unlike the conventional bus control logic circuit 100, the inventive control circuit 200 also comprises a disable circuit 206 having a test enable input terminal 208 and a test parity input terminal 210. The disable circuit 206 may be integral to or separate from the decoder 204.

Within the integrated circuit 202 a controller 212 is provided for testing the inventive control circuit 200 as described below. The controller 212 couples the first and second address input terminals 106a, 106b of the decoder 204, the data input terminals 114a–d of the drivers 100a–d, the soft driver 118's enable input terminal 120 and data input terminal 124, the buffer 126's buffer output terminal 130, and the disable circuit 206's test enable input terminal 208 and test parity input terminal 210. The controller 212 may be a test generator, such as a microprocessor, or any other similar hardware and/or software based testing system.

The inventive control circuit 200 has two modes of operation, a normal mode and a test mode, selectable by driving the test enable input terminal 208 to an appropriate logic state. For instance, if the controller 212 outputs a low state to the test enable input terminal 208, the disable circuit 206 is disabled and the control circuit 200 enters the normal mode; otherwise, if the controller 212 outputs a high state to the test enable input terminal 208, the disable circuit 206 is enabled and the control circuit 200 operates in the test mode.

When in the normal mode of operation the inventive control circuit 200 operates similarly to the conventional bus control logic circuit 100 of FIG. 1A, and the test parity input terminal 210 is not used. Accordingly, absent a bus-contention stuck fault, only one of the drivers 110a–d at a time may be selected via address signals applied to the address input terminals 106a–b of the decoder 204. No-connection bus faults and cross-connection bus faults, therefore, are identifiable as previously described.

When the inventive control circuit 200 is in the test mode, the disable circuit 206 is enabled and the controller 212 can selectively (based on parity) hard disable a number of the drivers 110a–d. For instance, assuming the drivers 110a–d have addresses (0,0), (0,1), (1,0) and (1,1), respectively, if the test parity input terminal 210 is driven to a high state, the drivers 110b and 110c (the "odd parity drivers") are hard disabled and therefore cannot be enabled when addressed via the decoder 204. Likewise, if the test parity input terminal 210 is driven to a low state, the drivers 110a and 110d (the "even parity drivers") are hard disabled and cannot be enabled when addressed via the decoder 204.

The ability to hard disable drivers based on parity allows detection of a bus-contention stuck fault via the following steps:

(1) drivers having addresses of a first parity (odd or even) are hard disabled; and (2) one of the drivers that is hard disabled is addressed by supplying the required address signals to address input terminals 106a–b.

Because the addressed driver is hard disabled, the only driver that can be enabled is a non-addressed driver erroneously enabled due to a bus-contention stuck fault. Accordingly, if the signal line 102 is placed in a known state via the soft driver 118, and steps (1) and (2) are performed, the signal line 102 will remain in the known state unless a driver is erroneously enabled (due to a bus-contention stuck fault) and changes the logic state of the signal line 102.

To determine if a bus-contention stuck fault exists, for example, within the driver circuitry controlling the even parity driver 110a, the following steps are performed:

(1) the control circuit 200 is placed in the test mode;

(2) the signal line 102 is driven to a known state (e.g., via the soft driver 118);

(3) the odd parity drivers 110b and 110c are hard disabled;

(4) the data input terminal 114a of the first driver 110a is driven to a logic state different from the known state;

(5) the address for the hard disabled driver 110b is driven on the address input terminals 106a–b; and (6) the logic state of the signal line 102 is monitored (e.g., via the buffer 126);

Because the driver 110b is hard disabled, the driver 110b is not enabled when it is addressed. Accordingly, if the signal line 102 changes from the known state, the driver 110a has been erroneously enabled due to a bus-contention stuck fault.

Figure 3:
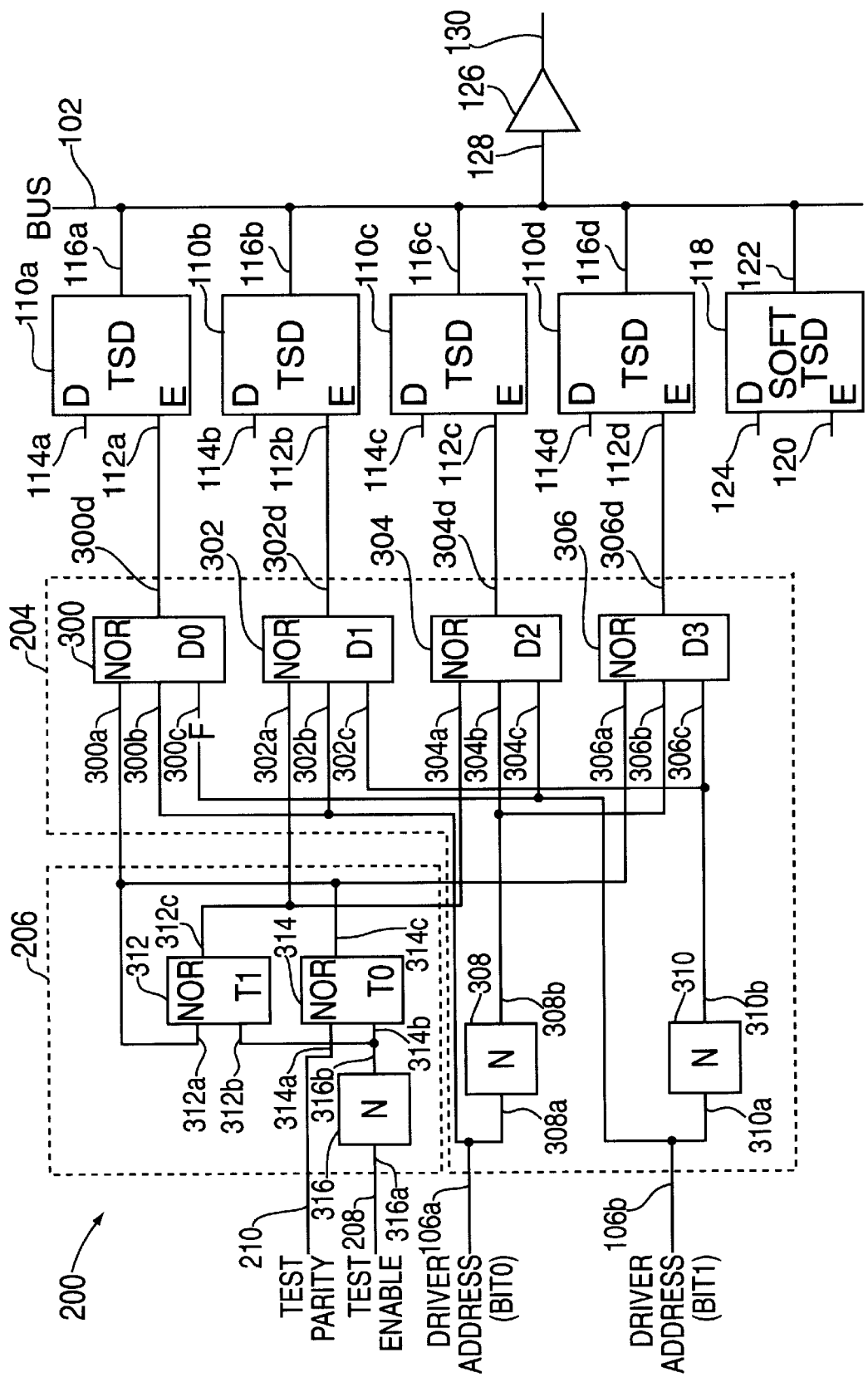
FIG. 3 is a schematic diagram of a NOR gate implementation of the testable bus control logic circuit of FIG. 2.

FIG. 3 is a schematic diagram of a NOR gate implementation of the testable control circuit 200 of FIG. 2 which shows the logic circuitry comprising the decoder 204 and the disable circuit 206. The decoder 204 comprises a plurality of decoder NOR gates 300–306 coupled to a pair of decoder inverters 308, 310. Each decoder NOR gate 300–306 comprises a plurality of NOR input terminals 300a–c, 302a–c, 304a–c and 306a–c, respectively, and a NOR output terminal 300d, 302d, 304d and 306d, respectively. Each decoder inverter 308, 310 has an inverter input terminal 308a, 310a, respectively, and an inverter output terminal 308b, 310b, respectively.

The disable circuit 206 comprises a pair of disable NOR gates 312, 314 coupled to a disable inverter 316. Each disable NOR gate 312, 314 comprises a plurality of NOR input terminals 312a–b, 314a–b, respectively, and a NOR output terminal 312c, 314c, respectively. The disable inverter 316 has an inverter input terminal 316a and an inverter output terminal 316b.

The various logic gates within the decoder 204 and the disable circuit 206 are interconnected as follows. The first address input terminal 106a of the decoder 204 is connected to the inverter input terminal 308a of the decoder's first inverter 308, to the NOR input terminal 300b of the decoder's first NOR gate 300, and to the NOR input terminal 302b of the decoder's second NOR gate 302. The second address input terminal 106b of the decoder 204 is connected to the inverter input terminal 310a of the decoder's second inverter 310, to the NOR input terminal 300c of the decoder's first NOR gate 300, and to the NOR input terminal 304c of the decoder's third NOR gate 304. The inverter output terminal 308b of the decoder's first inverter 308 is connected to the NOR input terminal 304b of the decoder's third NOR gate 304 and to the NOR input terminal 306b of the decoder's fourth NOR gate 306. The inverter output terminal 310b of the decoder's second inverter 310 is connected to the NOR input terminal 302c of the decoder's second NOR gate 302 and to the NOR input terminal 306c of the decoder's fourth NOR gate 306. When employed with the drivers 110a–d of FIG. 2, the NOR output terminals 300d–306d of the decoder's NOR gates 300–306 serve as the decoder output terminals 108a–d and are connected to the enable input terminals 112a–d of the drivers 110a–d, respectively.

Within the disable circuit 206, the test parity input terminal 210 is connected to the NOR input terminal 314a of the disable circuit's second NOR gate 314, and the test enable input terminal 208 is connected to the inverter input terminal 316a of the disable circuit's inverter 316. The inverter output terminal 316b of the disable circuit's inverter 316 is connected to the NOR input terminal 312b of the disable circuit's first NOR gate 312 and to the NOR input terminal 314b of the disable circuit's second NOR gate 314. The NOR output terminal 312c of the disable circuit's first NOR gate 312 is connected to the NOR input terminal 302a of the decoder's second NOR gate 302 and to the NOR input terminal 304a of the decoder's third NOR gate 304. The NOR output terminal 314c of the disable circuit's second NOR gate 314 is connected to the NOR input terminal 312a of the disable circuit's first NOR gate 312, to the NOR input terminal 300a of the decoder's first NOR gate 300, and to the NOR input terminal 306a of the decoder's fourth NOR gate 306.

In general terms, the decoder 204 and the disable circuit 206 can prevent more than one decoder output terminal 300d–306d (or 108a–d in FIG. 2), and thus more than one driver 110a–d, from being active at a given time, whether or not a bus-contention stuck fault condition is present. It is this feature that advantageously allows bus-contention stuck faults to be identified without actually producing bus contention on the signal line 102.

For instance, to detect a bus-contention stuck fault (F) on the NOR input terminal 300c of the first NOR gate 300, the data input terminal 124 of the soft driver 118 is set (e.g., via the controller 212) to a high state and the soft driver 118 is enabled. The signal line 102 thereby is driven to a high state. The logic state of the signal line 102 is monitored via the buffer 126.

With the signal line 102 in a high state, the disable circuit 206's test enable input terminal 208 and test parity input terminal 210, and the decoder 204's second address input terminal 106b are driven to a high state, while the decoder 204's first address input terminal 106a is driven to a low state. The data input terminal 114a of the first driver 110a also is driven to a low state.

TABLES 2A–F show the various logic states present on each logic gate within the decoder 204 and the disable circuit 206 assuming the above logic states are present on the disable circuit 206's test enable input terminal 208 and test parity input terminal 210, and on the decoder 204's address input terminals 106a–b. Note that the NOR input terminal 300c of the first NOR gate 300 is pinned at a low state due to the bus-contention stuck fault (F).

TABLE 2A

| TEST PARITY INPUT TERMINAL 210 | TEST ENABLE INPUT TERMINAL 208 | INVERTER INPUT TERMINAL 316a | INVERTER OUTPUT TERMINAL 316b | NOR INPUT TERMINAL 314a | NOR INPUT TERMINAL 314b | NOR OUTPUT TERMINAL 314c |
|---|---|---|---|---|---|---|
| 1 | 1 | 1 | 0 | 1 | 0 | 0 |

TABLE 2B

| NOR INPUT TERMINAL 312a | NOR INPUT TERMINAL 312b | NOR OUTPUT TERMINAL 312c | ADDRESS INPUT TERMINAL 106a | ADDRESS INPUT TERMINAL 106b | INVERTER INPUT TERMINAL 308a | INVERTER OUTPUT TERMINAL 308b |
|---|---|---|---|---|---|---|
| 0 | 0 | 1 | 0 | 1 | 0 | 1 |

TABLE 2C

| INVERTER INPUT TERMINAL 310a | INVERTER OUTPUT TERMINAL 310b | NOR INPUT TERMINAL 300a | NOR INPUT TERMINAL 300b | NOR INPUT TERMINAL 300c (F) | NOR OUTPUT TERMINAL 300d | DRIVER ENABLE TERMINAL 112a |
|---|---|---|---|---|---|---|
| 1 | 0 | 0 | 0 | 0 | 1 | 1 |

TABLE 2D

| NOR INPUT TERMINAL 302a | NOR INPUT TERMINAL 302b | NOR INPUT TERMINAL 302c | NOR OUTPUT TERMINAL 302d | DRIVER ENABLE TERMINAL 112b |
|---|---|---|---|---|
| 1 | 0 | 0 | 0 | 0 |

TABLE 2E

| NOR INPUT TERMINAL 304a | NOR INPUT TERMINAL 304b | NOR INPUT TERMINAL 304c | NOR OUTPUT TERMINAL 304d | DRIVER ENABLE TERMINAL 112c |
|---|---|---|---|---|
| 1 | 1 | 1 | 0 | 0 |

TABLE 2F

| NOR INPUT TERMINAL 306a | NOR INPUT TERMINAL 306b | NOR INPUT TERMINAL 306c | NOR OUTPUT TERMINAL 306d | DRIVER ENABLE TERMINAL 112b |
|---|---|---|---|---|
| 0 | 1 | 0 | 0 | 0 |

With reference to TABLES 2D and 2E, when the test parity input terminal 210 is driven to a high state, the second NOR gate 302's NOR input terminal 302a and the third NOR gate 304's NOR input terminal 304a are driven to a high state. A high state on any input terminal of a NOR gate ensures that the output terminal of the NOR gate remains in a low state regardless of the logic states present on the NOR gate's remaining input terminals. Accordingly, because the test parity input terminal 210 is driven to a high state, the NOR gates 302 and 304 cannot output a high state and therefore cannot enable either the odd parity second driver 110b or the odd parity third driver 110c. This is true even if the proper address signals for either driver are provided to address input terminals 106a–b. Thus, the odd parity drivers (second and third drivers 110b and 110c) are hard disabled.

As shown in TABLES 2C–F, only the NOR gate 300 (which controls the even parity first driver 110a and which has the bus-contention stuck fault (F)) outputs a high state in response to the odd parity address (e.g., (0, 1)) supplied to the decoder 204. Accordingly, only the faulted first driver 110a is enabled. Because the data input terminal 114a of the first driver 110a is driven to a low state, when the first driver 110a is enabled the logic state of the signal line 102 changes from the high state to the low state. The bus-contention stuck fault (F), therefore, can be detected without causing actual bus contention by monitoring the logic state of the signal line 102 for a change from a high to a low state. The remainder of the decoder NOR gates 302–306 can be tested for bus-contention stuck faults by varying which drivers are hard disabled (based on parity), and which driver's input terminal is driven to the low state.

The foregoing description discloses only the preferred embodiments of the invention, modifications of the above disclosed apparatus and method which fall within the scope of the invention will be readily apparent to those of ordinary skill in the art. For instance, the testable bus control logic circuit 200 of FIGS. 2 and 3 is extendible. With three address input terminals and four-input-terminal decoder NOR gates, up to eight drivers may be controlled, with six address input terminals and seven-input-terminal decoder NOR gates, up to sixty-four drivers may be controlled, etc. Additional inverter logic (i.e., one or more inverters) also is required.

In general, to extend the inventive bus control logic circuit the number of decoder NOR gate input terminals must exceed the number of address input terminals by one. Further, if a decoder NOR gate has an even number of non-inverted or an even number of inverted inputs coming from the address input terminals, the extra input terminal of the decoder NOR gate should be connected to the NOR output terminal 314c of the disable circuit's second NOR gate 314; otherwise, the extra input terminal of the decoder NOR gate should be connected to the NOR output terminal 312c of the disable circuit's first NOR gate 312. The above rule should be followed regardless of the number of address input terminals or drivers employed. Additionally, the reverse rule also may be employed wherein if a decoder NOR gate has an even number of non-inverted or an even number of inverted inputs coming from the address input terminals, the extra input terminal of decoder NOR gate should be connected to the NOR output terminal 312c of the disable circuit's first NOR gate 312; otherwise, the extra input terminal of the decoder NOR gate should be connected to the NOR output terminal 314c of the disable circuit's second NOR gate 314.

Finally, the control circuit 200 may comprise other logic gate implementations and/or may comprise software, hardware or a combination thereof.

Accordingly, while the present invention has been disclosed in connection with the preferred embodiments thereof, it should be understood that other embodiments may fall within the spirit and scope of the invention, as defined by the following claims.

The invention claimed is:

1. Apparatus comprising:
    a plurality of selectable three-state drivers directly coupled to a three-state bus for driving the bus when selected;
    a decoder coupled to the drivers for selecting only one of the drivers at one time; and
    a tester coupled to the decoder and to the bus for selectively neutralizing a number of the drivers and for monitoring a state of the bus to determine whether the decoder is malfunctioning.

2. Apparatus of claim 1, wherein the tester includes comparing means for comparing the state of the bus with an expected state.

3. A method for detecting a malfunction in a bus control logic circuit of a three-state bus, the bus control logic circuit for controlling a plurality of addressable three-state drivers coupled to a signal line, each three-state driver being addressable by an address of a first or a second parity, the method comprising:
- (a) hard disabling the drivers which are addressed by the addresses of the first parity;
- (b) addressing a driver having an address of the first parity; and
- (c) monitoring a logic state of the signal line to determine whether the bus control logic circuit is malfunctioning.

4. The method of claim 3 further comprising comparing the monitored logic state of the signal line to an expected logic state of the signal line.

5. The method of claim 3 wherein the malfunction is a stuck-fault condition in the bus control logic circuit, the method further comprising:
- detecting the presence of a stuck-fault condition within the bus control logic circuit when the signal line is in a first logic state; and
- detecting the absence of a stuck-fault condition within the bus control logic circuit when the signal line is in a second logic state.

6. The method of claim 3 wherein hard disabling the drivers which are addressed by the addresses of the first parity comprises providing a disable circuit comprising a test parity input terminal and driving the test parity input terminal to a first logic state to hard disable the drivers which are addressed be the addresses of the first parity.

7. The method of claim 6 further comprising providing the disable circuit with a test enable input terminal and driving the test enable input terminal to a first logic state to enable the test parity input terminal.

8. The method of claim 3 further comprising repeating (b) and (c) of claim 3 for every other driver having an address of the first parity.

9. The method of claim 3 further comprising after performing (a)–(c) of claim 3:
- (d) soft disabling the drivers which are addressed by the addresses of the first parity;
- (e) hard disabling the drivers which are addressed by the addresses of the second parity;
- (f) addressing a driver having an address of the second parity; and
- (g) continuing monitoring a logic state of the signal line to determine whether the bus control logic circuit is malfunctioning.

10. The method of claim 9 wherein the malfunction is a stuck-fault condition in the bus control logic circuit, the method further comprising:
- detecting the presence of a stuck-fault condition within the bus control logic circuit when the signal line is in a first logic state; and
- detecting the absence of a stuck-fault condition within the bus control logic circuit when the signal line is in a second logic state.

11. The method of claim 9 further comprising repeating (f) and (g) of claim 9 for every other driver having an address of the second parity.

12. A testable bus control logic circuit for controlling a plurality of drivers coupled to a signal line, each driver for driving digital signals onto the signal line when enabled and having an enable terminal for enabling/disabling the driver in response to an enable/disable signal, the testable bus control logic circuit comprising:
- a driver decoder, the driver decoder for assigning each driver an address;
- a plurality of address input terminals coupled to the driver decoder, the plurality of address input terminals for receiving address signals;
- a plurality of output terminals coupled to the driver decoder, each output terminal for coupling to an enable terminal of one of the drivers in response to the address signals; and
- a disable circuit coupled to the driver decoder for hard disabling the drivers addressable by address signals of a first parity.

13. The testable bus control logic circuit of claim 12 wherein:
- the disable circuit comprises:
  - a test parity input terminal for receiving a test parity signal;
  - a test enable input terminal for receiving a test enable signal that causes the disable circuit to place the bus control logic circuit in a test mode or in a normal mode;
  - disable logic circuitry coupled to the test parity input terminal and the test enable input terminal, for reading the test parity signal present on the test parity input terminal when the bus control logic circuit is placed in the test mode, and for either:
    - hard disabling each driver assigned a first parity address and soft disabling each driver assigned a second parity address if the test parity signal has a first logic state; or
    - soft disabling each driver assigned a first parity address and hard disabling each driver assigned a second parity address if the test parity signal has a second logic state; and
- the driver decoder comprises:
  - decoder logic circuitry coupled to the disabled circuit's disable logic circuitry for reading the address signals present on the bus control logic circuit's address input terminals when the bus control logic circuit is placed in the normal mode, and for outputting an enable signal on the bus control logic circuit's output terminal corresponding to the address signals.

14. The testable bus control logic circuit of claim 13 wherein:
- the driver decoder comprises:
  - decoder inverter logic coupled to at least one of the address input terminals of the bus control logic circuit; and
- a plurality of decoder NOR gates, each decoder NOR gate having a plurality of input terminals and an output terminal, a first one of the input terminals of at least one decoder NOR gate coupled to one of the address input terminals of the bus control logic circuit, and a second one of the input terminals of at least one decoder NOR gate coupled to the decoder inverter logic, the output terminal of each decoder NOR gate for coupling to an enable terminal of one driver; and
- the disable circuit comprises:
  - disable inverter logic coupled to the test enable input terminal of the disable circuit;
  - a first disable NOR gate having a plurality of input terminals and an output terminal, a first input terminal coupled to the test parity input terminal of the disable circuit and a second input terminal coupled to the disable inverter logic;

a second disable NOR gate having a plurality of input terminals and an output terminal, a first input terminal coupled to the disable inverter logic and a second input terminal coupled to the output terminal of the first disable NOR gate wherein:

if a decoder NOR gate has an even number of input terminals coupled to the address input terminals or an even number of input terminals coupled to the decoder inverter logic, the output terminal of the first disable NOR gate couples to an input terminal of the decoder NOR gate; otherwise the output terminal of the second disable NOR gate couples to an input terminal of the decoder NOR gate.

15. The testable bus control logic circuit of claim 13 wherein:

the driver decoder comprises:

decoder inverter logic coupled to at least one of the address input terminals of the bus control logic circuit; and a plurality of decoder NOR gates, each decoder NOR gate having a plurality of input terminals and an output terminal, a first plurality of the input terminals coupled to at least one of the address input terminals of the bus control logic circuit and a second plurality of the input terminals coupled to the decoder inverter logic, the output terminal of each decoder NOR gate for coupling to an enable terminal of one driver; and the disable circuit comprises:

disable inverter logic coupled to the test enable input terminal;

a first disable NOR gate having a plurality of input terminals and an output terminal, one input terminal coupled to the test parity input terminal and one input terminal coupled to the disable inverter logic;

a second disable NOR gate having a plurality of input terminals and an output terminal, one input terminal coupled to the disable inverter logic and one input terminal coupled to the output terminal of the first disable NOR wherein:

if a decoder NOR gate has an odd number of input terminals coupled to the address input terminals or an odd number of input terminals coupled to the decoder inverter logic, the output terminal of the first disable NOR gate couples to an input terminal of the decoder NOR gate; otherwise the output terminal of the second disable NOR gate couples to an input terminal of the decoder NOR gate.

16. The testable bus control logic circuit of claim 12 wherein the disable circuit comprises:

a first NOR gate coupled to the driver decoder and having an output terminal and a plurality of input terminals, the first NOR gate:

for hard disabling drivers assigned addresses of the first parity in response to a first logic state signal on a first input terminal; and for hard disabling drivers assigned addresses of the second parity in response to a second logic state signal on the first input terminal.

17. The testable bus control logic circuit of claim 12 wherein the driver decoder comprises:

inverter logic coupled to at least one of the address input terminals of the bus control logic circuit; and a plurality of decoder NOR gates, each decoder NOR gate having a plurality of input terminals and an output terminal, a first one of the input terminals of at least one decoder NOR gate coupled to one of the address input terminals of the bus control logic circuit and a second one of the input terminals of at least one decoder NOR gate coupled to the inverter logic, the output terminal of each decoder NOR gate for coupling to an enable terminal of one driver.

18. The testable bus control logic circuit of claim 17 wherein the number of decoder NOR gate input terminals equals the number of address input terminals plus one.

19. An integrated circuit comprising:

a bus having a signal line;

a plurality of drivers coupled to the signal line, each driver for driving digital signals onto the signal line when enabled and having an enable terminal for enabling/disabling the driver in response to an enable/disable signal; and a testable bus control logic circuit coupled to the plurality of drivers, the testable bus control logic circuit comprising:

a driver decoder, the driver decoder for assigning each driver an address;

a plurality of address input terminals coupled to the driver decoder, the plurality of address input terminals for receiving address signals;

a plurality of output terminals coupled to the driver decoder, each output terminal for coupling to an enable terminal of one of the drivers in response to the address signals; and a disable circuit coupled to the driver decoder for hard disabling the drivers addressable by address signals of a first parity.

20. A computer system comprising:

a bus having a signal line;

a plurality of drivers coupled to the signal line, each driver for driving digital signals onto the signal line when enabled and having an enable terminal for enabling/disabling the driver in response to an enable/disable signal; and a testable bus control logic circuit coupled to the plurality of drivers, the testable bus control logic circuit comprising:

a driver decoder, the driver decoder for assigning each driver an address;

a plurality of address input terminals coupled to the driver decoder, the plurality of address input terminals for receiving address signals;

a plurality of output terminals coupled to the driver decoder, each output terminal for coupling to an enable terminal of one of the drivers in response to the address signals; and a disable circuit coupled to the driver decoder for hard disabling the drivers addressable by address signals of a first parity.

21. An integrated circuit comprising:

a bus having a signal line;

a plurality of drivers coupled to the signal line, each driver for driving digital signals onto the signal line when enabled and having an enable terminal for enabling/disabling the driver in response to an enable/disable signal; and a testable bus control logic circuit coupled to the plurality of drivers comprising:

a driver decoder, the driver decoder assigning each driver an address;

a plurality of address input terminals coupled to the driver decoder, the plurality of address input terminals for receiving address signals and enabling one of the drivers;

a plurality of output terminals coupled to the driver decoder, each output terminal coupled to an enable terminal of one of the drivers; and disable means coupled to the driver decoder for hard disabling drivers addressable by address signals of a first parity.

22. The testable bus control logic circuit of claim 21 wherein:

the disable means comprises:

a test parity input for receiving a test parity signal;

a test enable input for receiving a test enable signal that causes the disable means to place the bus control logic circuit in a test mode or in a normal mode;

logic means coupled to the test parity input and the test enable input, for reading the test parity signal present on the test parity input when the bus control logic circuit is placed in the test mode, and for either:

hard disabling each driver assigned a first parity address and soft disabling each driver assigned a second parity address if the test parity signal has a first logic state; or soft disabling each driver assigned a first parity address and hard disabling each driver assigned a second parity address if the test parity signal has a second logic state; and the driver decoder comprises:

decoder logic circuitry coupled to the logic means for reading the address signals present on the bus control logic circuit's address input terminals when the bus control logic circuit is placed in the normal mode and for outputting an enable signal on the bus control logic circuit's output terminal corresponding to the address signals.

* * * * *